Figure 1:
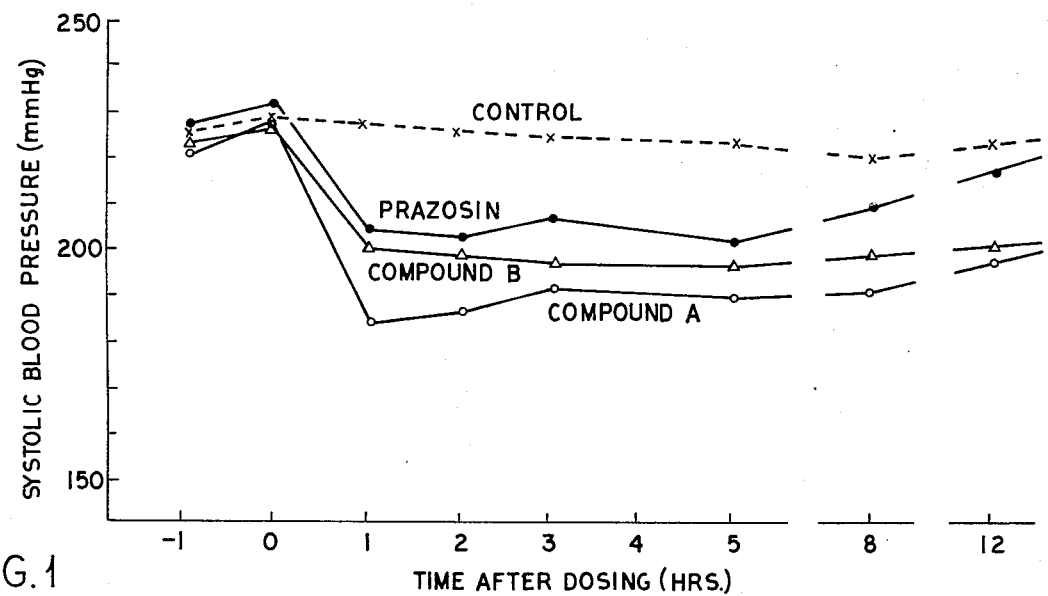

United States Patent [19]
Takahashi et al.

[11] 3,920,636
[45] Nov. 18, 1975

[54] QUINAZOLINE COMPOUNDS

[75] Inventors: Tohru Takahashi, Tokyo; Hachiro Sugimoto, Noda, both of Japan

[73] Assignee: Eisai Co., Ltd., Tokyo, Japan

[22] Filed: Oct. 29, 1973

[21] Appl. No.: 410,351

[30] Foreign Application Priority Data
Oct. 30, 1972  Japan............................... 47-107879
Oct. 30, 1972  Japan............................... 47-107880

[52] U.S. Cl. ...... 260/240 J; 260/240 D; 260/240.1; 260/251 Q; 260/256.4 N; 260/256.4 Q; 424/244; 424/251; 424/263; 424/282; 424/285
[51] Int. Cl.²............... C07D 403/04; C07D 405/14
[58] Field of Search....... 260/256.4 Q, 240 J, 240.1, 260/240 D, 251 Q, 256.4 N, 239 BC

[56] References Cited
UNITED STATES PATENTS

| | | | |
|---|---|---|---|
| 3,511,836 | 5/1970 | Hess.................................. | 424/251 |
| 3,574,212 | 6/1971 | Hess............................ | 260/256.4 Q |
| 3,635,979 | 1/1972 | Hess............................ | 260/256.4 Q |
| 3,669,968 | 6/1972 | Hess............................ | 260/256.4 Q |
| 3,769,286 | 10/1973 | Hess............................ | 260/256.4 Q |
| 3,812,126 | 5/1974 | Zust et al..................... | 260/239 BC |

OTHER PUBLICATIONS
Koninklijke Chem. Abst. 78(1973) No. 72178

*Primary Examiner*—Arthur P. Demers
*Attorney, Agent, or Firm*—Woodhams, Blanchard and Flynn

[57] ABSTRACT

2-(4'-substituted homopiperazino)-4-amino-6,7-dimethoxy-quinazolines having the following chemical formula (I):

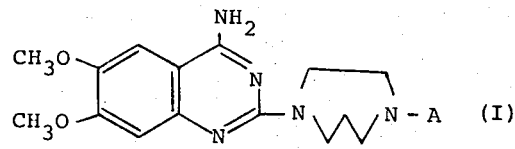

wherein A represents a group selected from the following (i) and (ii):

(i) R¹—CO—:
wherein R¹ represents a lower alkyl group of C₁–C₄; phenyl group substituted with a halogen atom, methoxy group of methanesulfonyl group; and styryl group unsubstituted or ring substituted with a halogen atom, methoxy group or 3,4-methylenedioxy group; or 2-furyl group, (ii) R²—:

R² represents a lower alkyl group; benzyl group substituted with a halogen atom or methoxy group; or β-(2-pyridyl)ethyl group, and their pharmacologically acceptable acid-addition salts are prepared by reacting at a 2-homopiperazino-4-amino-6,7-dimethoxy-quinazoline with a reactant of chemical formula of R¹-COOH or its reactive derivative or a reactant of chemical formula of R²-X wherein X represents a halogen atom.

4 Claims, 3 Drawing Figures

QUINAZOLINE COMPOUNDS

The present invention relates to new quinazoline compounds. Particularly, the present invention relates to 2-(4'-substituted homopiperazino)-4-amino-6,7-dimethoxy-quinazolines having the following chemical formula (I):

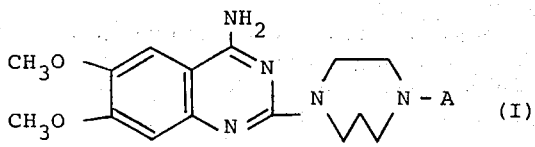

wherein A represents a group selected from the following (i) and (ii):
(i) R¹—CO—:
  wherein R¹ represents a lower alkyl group of $C_1$–$C_4$; phenyl group substituted with a halogen atom, methoxy group or methanesulfonyl group; a styryl group unsubstituted or ring substituted with a halogen atom, methoxy group or 3,4-methylenedioxy group; or 2-furyl group,
(ii) R²—:
  R² represents a lower alkyl group of $C_1$–$C_4$; benzyl group substituted with a halogen atom or methoxy group; or β-(2-pyridyl)ethyl group, and pharmacologically acceptable acid-addition salts thereof, and a process for preparing such quinazoline compounds. As the pharmacologically acceptable acids, there may be mentioned inorganic acids such as hydrochloric acid, sulfuric acid, nitric acid and phosphoric acid and organic acids such as acetic acid, fumaric acid, maleic acid, tartaric acid, citric acid, succinic acid and methanesulfonic acid. Compounds (I) and pharmacologically acceptable acid-addition salts thereof exhibit various pharmacological effects, particularly excellent hypotensive effect.

Compounds (I) of the present invention are synthesized by the following process:

chemical formula (III). Reactants (III) are classified into the following two groups according to A and the reactions proceed according to them.
(i) When A represents R¹—CO—:
2-Homopiperazino-4-amino-6,7-dimethoxy-quinazolines of the following formula (II):

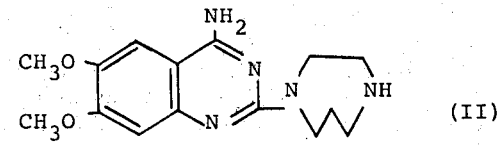

are reacted with carboxylic acids of the following formula (III'):

R¹—COOH       (III')

or reactive derivatives thereof. As such reactive derivatives of acids, there may be mentioned acid halides, acid anhydrides and active esters. The reactions can be carried out in the absence of any solvent or in the presence of an organic reaction solvent which is inert to the reaction such as benzene, toluene or xylene. In case the reaction is carried out at room temperature, ketone solvents such as acetone or methyl ethyl ketone may be used without causing side reaction. The reaction can be carried out more smoothly by incorporating a deacidifying agent such as triethylamine, an alkali bicarbonate or pyridine in the reaction system.

(ii) When A represents R²—:
Compounds (II) are reacted with halogenides of the following formula:

R²—X       (III'')

wherein X represents a halogen atom. The reactions can be carried out in the absence of any solvent or in the presence of an organic solvent, which is inert to the reaction, such as lower alcohols, for example, methanol, ethanol, propanol or isopropanol; a benzene compound, for example, benzene per se, toluene or xylene; an ether, for example, diethyl ether, diisopropyl ether or tetrahydrofuran. Reaction temperature may be selected suitably in the range of from room temperature to a boiling point of the solvent used. The reaction can

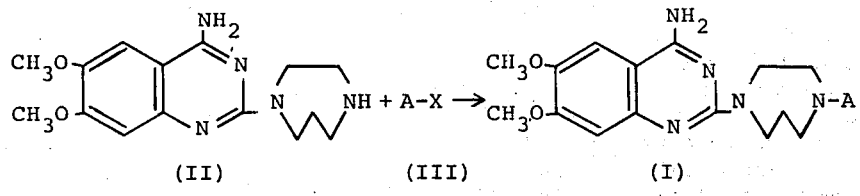

wherein A has the same meaning as above and X represents a functional group capable of forming nitrogen-carbon bond.

That is, compounds (I) are synthesized by reacting 2-homopiperazino-4-amino-6,7-dimethoxy-quinazolines of the chemical formula (II) with reactants of the be carried out more smoothly by incorporating a deacidifying agent such as triethylamine, an alkali bicarbonate or pyridine in the reaction system.

Compounds (II) used as the starting materials in the present invention are new compounds which are synthesized by the following process:

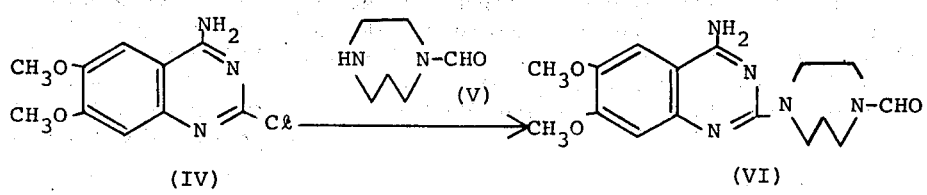

—Continued

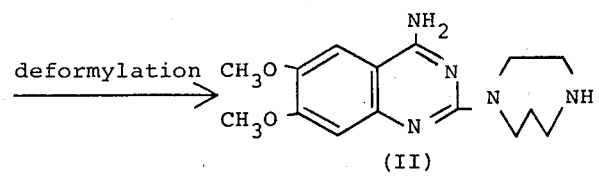

Compound (II) can be obtained by the reaction of 2-chloro-4-amino-6,7-dimethoxy-quinazoline (IV) with N-formyl-homopiperazine (V) followed by the deformylation of the resulting 2-(N'-formyl-homopiperazino)-4-amino-6,7-dimethoxy-quinazoline (VI) in a usual manner.

The biological activities of the compounds of this invention, particularly in regard to their effectiveness in reducing blood pressure in hypertensive subjects, are illustrated by the following pharmacological tests. Some of compounds (I) of the present invention exhibit more excellent biological activity than that of Prazosin (U.S. Pat. No. 3,511,836), which is comparable in its chemical formula and its biological activity with those of compounds (I).

Figure 2:
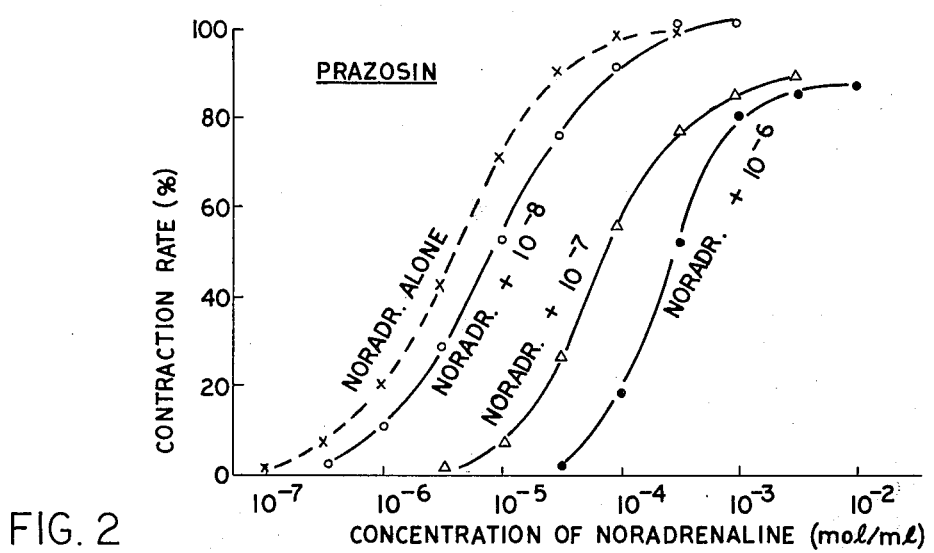
Figure 3:
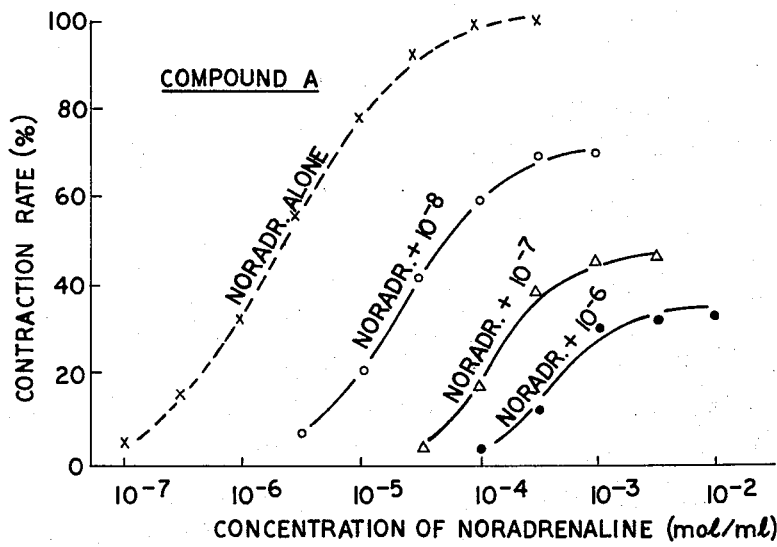

Chemical formulas of the representative two compounds of this invention and the standard compound Prazosin are as follows:

Compound A:
2-[N'-(2-furoyl)-homopiperazino]-4-amino-6,7-dimethoxy-quinazoline hydrochloride Compound B:
2-(N'-butyroyl-homopiperazino)-4-amino-6,7-dimethoxy-quinazoline hydrochloride Prazosin:
2-[N'-(2-furoyl)-piperazino]-4-amino-6,7-dimethoxy-quinazoline hydrochloride In the Drawing:
FIGS. 1 to 3 are graphs for showing the results of pharmacological tests on the compounds of this present invention and Prazosin.

The hypotensive action was demonstrated by the following animal experiments:

EXP. 1.

The compounds were dissolved in saline solution and administered intraperitoneally to normotensive rats under pentobarbital sodium-anesthesia. The compounds A and B, as well as Prazosin, reduced blood pressure by 20–40 mmHg and prevented the pressor effect of adrenaline (3μg/kg, intravanously). Whereas there was no recognizable difference in the degree of hypotensive action among the three compounds, the antiadrenergic effect of compound A was more remarkable than those of compound B and Prazosin.

EXP. 2.

The experimental hypertension, which was induced in rats by chronic treatment with desoxycorticosteroneacetate and saline. The oral dose 1 mg/kg of respective compounds reduced blood pressure by 40–60 mmHg, and the hypotensive effect lasted more than six hours.

EXP. 3.

The compounds lowered the blood pressure of the inbred strain of the spontaneously hypertensive rat (SHR) which was established by Okamoto and Aoki. FIG. 1 illustrates the hypotensive effect of the respective compounds at oral dose 1 mg/kg in SHR comparatively. Compound A was most potent in this model hypertension, and the effect of compounds A and B lasted more than 12 hours.

Some experimental data concerning their mechanism of hypotensive action and general pharmacological properties elucidated the following specific feature of compound A and compound B:

EXP. 4.

The contraction of isolated vas deferens by noradrenaline was prevented by the treatment with compound A and compound B as well as Prazosin. FIGS. 2 and 3 illustrates the interaction of noradrenaline-Prazosin and noradrenaline-compound A, respectively. The sigmoid curve of dose (concentration of noradrenaline (mol/ml))-response (contraction of vas deferens) was shifted parallel to the right under the effect of Prazosin ($1 \times 10^{-8}$ to $1 \times 10^{-6}$ mol/ml), i.e. a competitive antagonism between noradrenaline and Prazosin was recognized (FIG. 2). Compound A shifted the dose-response curve of noradrenaline to the right more prominently than Prazosin. In addition to the shift to the right, the maximum contraction by noradrenaline was remarkably reduced under the effect of compound A. This means that compound A has not only a component of competitive but also a component of none-competitive inhibition against the agonist (FIG. 3). The interaction between compound B and noradrenaline was found to be analogous to that with compound A. In Table 1 is listed the 50% inhibiting concentration ($ID_{50}$) of compounds A, B and Prazosin against noradrenaline, i.e. the calculated concentration of the referred compound which might inhibit to a half of the contraction of vas deferens under the effect of noradrenaline ($1 \times 10^{-4}$ mol/ml). The resulting relative potencies then become: compound A, 10; compound B, 4; Prazosin, 1 (Table 1).

Table 1

| Compound | $ID_{50}$ (mol/ml) |
| --- | --- |
| Compound A | $2 \times 10^{-8}$ |
| Compound B | $5 \times 10^{-8}$ |
| Prazosin | $2 \times 10^{-7}$ |

EXP. 5.

Compound A and compound B were found to have potent inhibiting effect on the platelet aggregation. The aggregation of platelets was induced by addition of adenosine diphosphate ($1 \times 10^{-6}$ mol/ml) into platelet rich plasma which was prepared with rabbit plasma by centrifugation at 150xg for 20 minutes. The aggregation of platelets was definitely prevented under the presence of $1.25 \times 10^{-5}$ g/ml of compound A as well as compound B, whereas it was not affected by Prazosin (Table 2).

Table 2

| Compound | Concentration (g/ml) | Inhibition (%) |
| --- | --- | --- |
| Compound A | $1.25 \times 10^{-6}$ | 7 |
|  | $1.25 \times 10^{-5}$ | 20 |
| Compound B | $1.25 \times 10^{-6}$ | 11 |
|  | $1.25 \times 10^{-5}$ | 23 |
| Prazosin | $1.25 \times 10^{-6}$ | 0 |
|  | $1.25 \times 10^{-5}$ | 2 |

From the results mentioned above, the following was concluded;

1. Compound A and compound B are equipotent or somewhat more effective in hypotensive action as Prazosin. Particularly, it is remarkable that the hypotensive effects of compounds A and B are more prominent and long lasting in spontaneously hypertensive rats than that of Prazosin, because the inbred hypertensive animals are sometimes referred to as more preferable model for essential hypertension.

2. The results of Exp. 4, regarding the interaction with noradrenaline, indicate that compounds A and B may differ in mechanism of action from Prazosin; the compounds A and B have a direct relaxing effect on smooth muscle in addition to their potent α-blocking action.

3. In addition to the hypotensive action, compounds A and B are effective to prevent an experimental plateletaggregation. The aggregation of platelets is one of factors for the formation of thrombus, which sometimes is a cause of death from disturbance of coronary or cerebular circulation accompanied with hypertension in high frequency. Therefore, the inhibiting effect on the aggregation of platelets is considered to be beneficial. Prazosin is not effective in this action or its effect is neglegible.

As mentioned above, the compounds of the present invention are considered to be effective for prevention and treatment of various types of hypertension such as essential, renal and malignant hypertensions. The compounds may be available for both oral and parenteral use in suitable dosage forms, such as of tablets, pills, granules, capsules, powders, solutions and suppositories. In moderate or severe hypertension, the recommended adult dose may be in a range of 1 to 200 mg per day, preferably 5 to 50 mg per day for oral use.

The present invention will be illustrated by way of examples, which by no means limit the invention.

EXAMPLE 1

Synthesis of 2-[$N^4$-(2-furoyl)-homopiperazino]-4-amino-6,7-dimethoxy-quinazoline:

a. Synthesis of 2-homopiperazino-4-amino-6,7-dimethoxy-quinazoline:

17 Grams of 2-chloro-4-amino-6,7-dimethoxy-quinazoline and 18.2 g of N-formylhomopiperazine are added to 170 ml of butanol and the whole is refluxed with stirring for three hours. After completion of the reaction, the mixture is cooled, and the crystals thus precipitated are filtered out, washed with a small quantity of ethanol and air-dried. 25 Grams of crude crystal are obtained. 13 Grams of the crystal thus obtained are taken and added with 80 ml of 9% hydrochloric acid. The mixture is refluxed under stirring for 60 minutes. After completion of the reaction, the mixture is allowed to cool. The crystal thus precipitated are filtered out and then recrystallized from a mixture of methanol and ethanol.

Yield: 10.7 g (80.4%)
Melting point: 246–247°C
Elementary analysis (as $C_{15}H_{21}N_5O_2 \cdot 2HCl \cdot \frac{1}{2}H_2O$):

|  | C | H | N |
| --- | --- | --- | --- |
| Theoretical (%) | 46.74 | 6.29 | 18.17 |
| Found (%) | 46.44 | 6.40 | 17.90 | b. Synthesis of 2-[$N^4$-(2-furoyl)-homopiperazino]-4-amino-6,7-dimethoxy-quinalozine:

A solution of 3 g of 2-homopiperazino-4-amino-6,7-dimethoxy-quinazoline in 60 ml of acetone is added dropwise to a solution of 1.3 g of 2-furancarboxylic acid chloride in 30 ml of acetone under stirring and ice-cooling. After completion of the addition, the stirring is continued for additional one hour to complete the reaction. The crystals thus precipitated are filtered out and recrystallized from a mixture of methanol and ethanol.

Yield: 3.1 g (70.4%)
Melting point: 278–280°C
Elementary analysis (as $C_{20}H_{23}N_5O_4 \cdot HCl$):

|  | C | H | N |
| --- | --- | --- | --- |
| Theoretical (%) | 55.36 | 5.59 | 16.15 |
| Found (%) | 55.30 | 5.45 | 16.18 |

EXAMPLE 2

Synthesis of 2-($N^4$-butyl-homopiperazino)-4-amino-6,7-dimethoxy-quinazoline:

2 Grams of triethylamine are added to a solution of 1.5 g of 2-homopiperazino-4-amino-6,7-dimethoxy-quinazoline and 1.5 g of α-butyl chloride in 20 ml of n-butanol and the mixture is refluxed under stirring for 24 hours. After completion of the reaction, the solvent is distilled off and then the thus obtained residue is made alkaline by addition of 10% aqueous caustic soda solution. The oily substance thus separated out is extracted with chloroform. The extract is washed with water, dried with potassium carbonate and filtered. The filtrate is concentrated. The residue thus obtained is dissolved in 30 ml of isopropanol. The solution is added with 3 ml of saturated isopropanol/hydrochloric acid and the resulting crystals are filtered out and recrystallized from a mixture of methanol/ethanol. The aimed compound is obtained as dihydrochloride.

Yield: 0.9 g (50.6%)
Elementary analysis (as $C_{19}H_{29}N_5O_2 \cdot 2HCl \cdot \frac{1}{2}H_2O$):

|  | C | H | N |
| --- | --- | --- | --- |
| Theoretical (%) | 51.68 | 7.32 | 15.86 |
| Found (%) | 51.74 | 7.13 | 16.42 |

EXAMPLES 3 to 17

Various compounds shown in Table 3 were obtained by the methods similar to those used in Examples 1 and 2.

The results are summarized in Table 3.

Table 3

| Example | A | Molecular formula M.P. (°C) | Elementary analysis (%) Theoretical / Found | | |
|---|---|---|---|---|---|
| | | | C | H | N |
| 3 | CH₃CO— | C₁₇H₂₃N₅O₃ . HCl . H₂O / 235 – 240 | 51.05 / 51.16 | 6.57 / 6.34 | 17.52 / 17.8 |
| 4 | (CH₃)₂CHCO— | C₁₉H₂₇N₅O₃ . HCl . ½H₂O / 240 – 250 | 54.46 / 54.20 | 6.99 / 6.97 | 16.71 / 17.18 |
| 5 | CH₃CH₂CH₂CO— | C₁₉H₂₇N₅O₃ . HCl / 280 – 282 | 55.66 / 55.40 | 6.90 / 6.89 | 17.09 / 16.79 |
| 6 | 2-Cl-C₆H₄-CO— | C₂₂H₂₄ClN₅O₃ . HCl . H₂O / 235 – 240 | 53.22 / 53.18 | 5.49 / 5.79 | 14.11 / 13.61 |
| 7 | 2-OCH₃-C₆H₄-CO | C₂₃H₂₇N₅O₄ . HCl / 225 – 235 | 58.27 / 57.78 | 5.97 / 6.09 | 14.78 / 14.32 |
| 8 | CH₃SO₂-C₆H₄-CO— | C₂₃H₂₇N₅O₅S . HCl / 270 – 272 | 52.91 / 52.98 | 5.42 / 5.44 | 13.42 / 13.45 |
| 9 | 2,6-(OCH₃)₂-C₆H₃-CO— | C₂₄H₂₉N₅O₅ . HCl . ½H₂O / 220 – 225 | 56.18 / 56.06 | 6.10 / 6.29 | 13.65 / 13.46 |
| 10 | C₆H₅-CH=CH-CO— | C₂₄H₂₇N₅O₃ . HCl . H₂O / 210 – 215 | 59.06 / 58.65 | 6.21 / 5.82 | 14.35 / 14.20 |
| 11 | Cl-C₆H₄-CH=CH-CO— | C₂₄H₂₆N₅O₃ . HCl . H₂O / 245 – 250 | 55.17 / 55.62 | 5.61 / 5.46 | 13.41 / 13.83 |
| 12 | 3,4-(OCH₂O)-C₆H₃-CH=CH-CO— | C₂₅H₂₆N₅O₅ . HCl . ½H₂O / 235 – 240 | 57.51 / 57.80 | 5.42 / 5.62 | 13.42 / 13.52 |
| 13 | 3,4,5-(CH₃O)₃-C₆H₂-CH=CH-CO— | C₂₇H₃₁N₅O₆ . HCl . ½H₂O / 292 – 294 | 57.18 / 57.52 | 5.88 / 6.06 | 12.35 / 12.41 |
| 14 | CH₃— | C₁₆H₂₃N₅O₂ / 208 – 210 | 60.54 / 60.37 | 7.32 / 7.22 | 22.07 / 22.07 |
| 15 | 2,4-Cl₂-C₆H₃-CH₂— | C₂₂H₂₅Cl₂N₅O₂ . 2HCl / 240 – 245 | 49.35 / 49.44 | 5.09 / 5.56 | 13.08 / 12.52 |
| 16 | CH₃O-C₆H₄-CH₂— | C₂₃H₂₉N₅O₃ . 2HCl / 280 – 285 | 55.63 / 55.59 | 6.31 / 6.36 | 14.11 / 14.34 |
| 17 | 2-pyridyl-CH₂-CH₂— | C₂₂H₂₈N₆O₂ . 3HCl / 250 – 260 | 51.01 / 50.52 | 6.04 / 6.30 | 16.23 / 15.90 |

What is claimed is:
1. A compound selected from the group consisting of 2-(4'-substituted homopiperazino)-4-amino-6,7-dimethoxy-quinazolines having the formula:

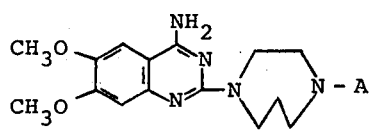

wherein A is selected from the group consisting of (i) and (ii), wherein
   (i) is R¹—CO—, wherein R¹ is alkyl of C₁–C₄; phenyl substituted with halogen, methoxy or methanesulfonyl; unsubstituted styryl or styryl ring substituted with halogen, methoxy or 3,4-methylenedioxy; or 2-furyl, and
   (ii) is R²—, wherein R² is alkyl of C₁–C₄; benzyl substituted with halogen or methoxy; or β-(2-pyridyl)ethyl, and pharmacologically acceptable acid-addition salts thereof.

2. A compound according to claim 1, 2-[N'-(2-furoyl)-homopiperazino]-4-amino-6,7-dimethoxy-quinazoline hydrochloride.

3. A compound according to claim 1, 2-(N'-butyroyl-homopiperazino)-4-amino-6,7-dimethoxy-quinazoline hydrochloride.

4. A compound having the formula

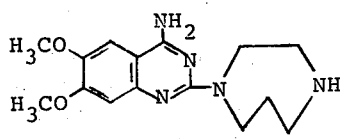

* * * * *